United States Patent
Cendrillon et al.

(10) Patent No.: US 8,320,526 B2
(45) Date of Patent: Nov. 27, 2012

(54) METHOD, EQUIPMENT AND DIGITAL SUBSCRIBER LINE SYSTEM FOR SPECTRUM OPTIMIZATION

(75) Inventors: Raphael Cendrillon, Hong Kong (CN); Liming Fang, Shenzhen (CN); Lihe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 12/857,045

(22) Filed: Aug. 16, 2010

(65) Prior Publication Data

US 2010/0303213 A1 Dec. 2, 2010

Related U.S. Application Data (63) Continuation of application No. PCT/CN2009/071282, filed on Apr. 15, 2009.

(30) Foreign Application Priority Data

Apr. 18, 2008 (CN) .......................... 2008 1 0095410

(51) Int. Cl.
*H04M 1/24* (2006.01)
*H04M 3/08* (2006.01)
*H04M 3/22* (2006.01)

(52) U.S. Cl. .................................... 379/1.03; 379/1.04

(58) Field of Classification Search ................ 379/1.01, 379/1.03, 1.04, 24, 28; 370/252; 375/230, 375/233
See application file for complete search history.

(56) References Cited

U.S. PATENT DOCUMENTS

| | | | |
|---|---|---|---|
| 6,268,815 B1 | 7/2001 | Gustavsson et al. | |
| 6,532,277 B2 * | 3/2003 | Ulanskas et al. | ............ 379/27.01 |
| 6,765,954 B1 | 7/2004 | Eichrodt et al. | |
| 6,990,196 B2 | 1/2006 | Zeng et al. | |

(Continued)

FOREIGN PATENT DOCUMENTS

| | | |
|---|---|---|
| CN | 101047459 A | 10/2007 |
| CN | 101133564 A | 2/2008 |

(Continued)

OTHER PUBLICATIONS

State Intellectual Property Office of the People'S Republic of China, Search Report in International Application No. PCT/CN2009/071282 (Jul. 9, 2009).

(Continued)

*Primary Examiner* — Quoc D Tran
(74) *Attorney, Agent, or Firm* — Leydig, Voit & Mayer, Ltd.

(57) ABSTRACT

The embodiments of the present invention disclose a spectrum optimization method and device and digital subscriber line system, the method comprising: calculating according to acquired information of each of respective subcarriers on the DSL line to be optimized to obtain optimized transmission power of a subcarrier to be optimized in a DSL line to be optimized; calculating a transmission rate of the DSL line to be optimized according to the optimized transmission power; and comparing the transmission rate with a target rate of the DSL line to be optimized, and if the transmission rate is less than the target rate, updating the information of an optimized subcarrier, and performing a recalculation. The embodiments of the present invention can overcome the problem of the conventional art that it is difficult to converge the rate weighted coefficient, and improve the rate of a given subscriber line while reduce power loss caused by the given subscriber line to other subscriber lines in the same bundle of cables.

18 Claims, 2 Drawing Sheets

U.S. PATENT DOCUMENTS

| | | | |
|---|---|---|---|
| 7,010,441 B2 | 3/2006 | Galli et al. | |
| 7,106,833 B2 | 9/2006 | Kerpez | |
| 7,167,511 B1 | 1/2007 | Goren et al. | |
| 7,216,268 B2 | 5/2007 | Ryckebusch et al. | |
| 7,302,379 B2 | 11/2007 | Cioffi et al. | |
| 7,356,049 B1 | 4/2008 | Rezvani | |
| 7,697,408 B2 * | 4/2010 | Schneider et al. | 370/201 |
| 2002/0136397 A1 | 9/2002 | Zeng et al. | |
| 2003/0086514 A1 * | 5/2003 | Ginis et al. | 375/346 |
| 2004/0164888 A1 | 8/2004 | Eichrodt et al. | |
| 2004/0264559 A1 | 12/2004 | Cendrillon et al. | |
| 2005/0123028 A1 | 6/2005 | Cioffi et al. | |
| 2005/0152385 A1 | 7/2005 | Cioffi | |
| 2005/0259725 A1 | 11/2005 | Cioffi | |
| 2006/0039456 A1 | 2/2006 | Bostoen et al. | |
| 2006/0095565 A1 | 5/2006 | Rhee et al. | |
| 2006/0198430 A1 | 9/2006 | Rhee et al. | |
| 2007/0280334 A1 | 12/2007 | Lv et al. | |
| 2009/0122848 A1 * | 5/2009 | Horvat et al. | 375/224 |

FOREIGN PATENT DOCUMENTS

| | | | |
|---|---|---|---|
| CN | 101174855 A | 5/2008 | |
| CN | 101192850 A | 6/2008 | |
| WO | WO 2008/044975 A1 | 4/2008 | |

OTHER PUBLICATIONS

Cendrillon, R., et al., "DSM from Theory to Practice," Nov. 30-Dec. 4 2008, presented at the IEEE "GLOBECOM" 2008 proceedings, New Orleans, LA.

Extended European Search Report in corresponding European Application No. 09732966.8 (May 26, 2011).

Cendrillon et al., "Autonomous Spectrum Balancing for Digital Subscriber Lines," IEEE Transaction on Signal Processing, Aug. 2007, vol. 55, No. 8, Institute of Electrical and Electronic Engineers, Geneva, Switzerland.

Jagannathan et al., "Distributed adaptive bit-loading for spectrum optimization in multi-user multicarrier systems," Department of Electrical Engineering, 2008, Stanford University, Stanford, California.

Written Opinion of the International Searching Authority in corresponding PCT Application No. PCT/CN2009071282 (Jul. 9, 2009).

1st Office Action in corresponding Chinese Application No. 200810095410.3 (Dec. 31, 2011).

European Patent Office, 1st Office Action in European Application No. 09732966.8 (Feb. 27, 2012).

* cited by examiner

METHOD, EQUIPMENT AND DIGITAL SUBSCRIBER LINE SYSTEM FOR SPECTRUM OPTIMIZATION

CROSS-REFERENCE TO RELATED APPLICATIONS

This application is a continuation of International Application No. PCT/CN2009/071282, filed on Apr. 15, 2009, which claims priority to Chinese Patent Application No. 200810095410.3, filed on Apr. 18, 2008, both of which are hereby incorporated by reference in their entireties.

FIELD OF INVENTION

The embodiments of the present invention relate to the field of communication technology, and particularly, to a spectrum optimization method, equipment and digital subscriber line system.

BACKGROUND OF THE INVENTION

The Digital Subscriber Line (DSL) technology is a high speed transmission technology that performs data transmission through telephone twist pair line, i.e., Unshielded Twist Pair (UTP), including Asymmetrical Digital Subscriber Line (ADSL), Very-high-bit-rate Digital Subscriber Line (VDSL), Digital Subscriber Line based on Integrated Services Digital Network (ISDN) (ISDN Digital Subscriber Line, IDSL) and Single-pair High-bit-rate Digital Subscriber Line (SHDSL), etc.

With the improvements of the frequency bands used by various DSL technologies (xDSL), more and more problems of cross-talk, especially cross-talk in high frequency bands, pop out. The uplink and downlink channels of the xDSL use Frequency Division Multiplexing (FDM), and the influence from the Near-End Cross-Talk (NEXT) can be greatly reduced through the filter, thus the system performance will not be damaged too much; but due to the frequency band of the Far-End Cross-Talk (FEXT) and the received signal in the system being within the same frequency band, the transmission performance of the system will be seriously affected. When multiple channels of subscribers in a bundle of cables all require activating xDSL service, some lines will have low rates, unstable performances and even cannot be conducted due to the FEXT, and finally, the line activation rate of the DSL Access Multiplexer (DSLAM) is low.

Figure 1:
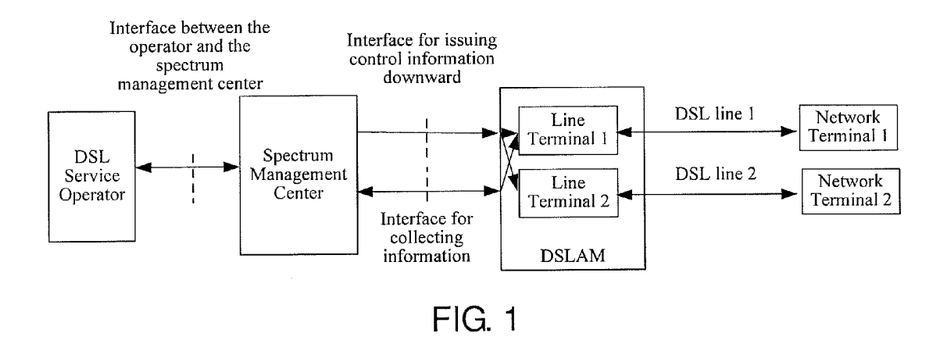
FIG. 1 is a conventional network reference model for implementing the DSM.

The conventional art uses a Dynamic Spectrum Management (DSM) technology to reduce the influence of cross-talk. The DSM technology reduces the cross-talk by automatically adjusting transmission power on each line of the network. FIG. 1 is a conventional network reference model for implementing the DSM.

In the conventional art, the following equation is generally optimized by Optimum Spectrum Balancing (OSB), Iterative Spectrum Balancing (ISB) and Iterative Water-Filling (IWF), so as to maximize a sum of weighted rates of all subscribers by adjusting the transmission power value of all subscribers on each subcarrier respectively, under the condition that the total transmission power of each subscriber does not exceed a threshold.

$$\max \sum_{n=1}^{N} \omega_n \sum_{k=1}^{K} b_k^n - \sum_{n=1}^{N} \lambda \sum_{k=1}^{K} S_k^n$$

Wherein, $s_k^n$ is transmission power of the $n^{th}$ subscriber at the $k^{th}$ subcarrier; $P_n$ is a threshold of total power of the $n^{th}$ subscriber; $\omega_n$ is a rate weight coefficient of the $n^{th}$ subscriber; $\lambda$ is a Lagrange multiplier; N is a total number of the subscribers; and K is a total number of the frequency points.

During the process of implementing the present invention, the inventor finds that the conventional art has the following defects: in the current DSM Level 2 technology, most algorithms need to search the rate weight coefficient $\omega_n$. But the variation range of the rate weight coefficient may be very extensive and is difficult to converge, sometimes a slightly variation of the rate weight coefficient may cause the rate to increase or decrease for a large extent, therefore it is difficult to search the rate weight coefficient, thus there exists a certain difficulty in optimizing the rate to a target rate with the above algorithms.

SUMMARY OF THE INVENTION

The embodiments of the present invention provide a method, equipment and digital subscriber line system for spectrum optimization, which may overcome the problem of the conventional art that it is difficult to converge the rate weighted coefficient and improve the rate of a given subscriber line while reducing cross-talk caused by the given subscriber line to other subscriber lines in the same bundle of cables, and at the same time, avoid the power loss of itself.

In order to achieve the above object, the embodiments of the present invention provide a spectrum optimization method, including: calculating according to acquired information of each of respective subcarriers in a line to be optimized to obtain optimized transmission power of a subcarrier to be optimized on the line to be optimized; calculating according to the optimized transmission power of the subcarrier to be optimized to obtain a transmission rate of the line to be optimized; and comparing the transmission rate of the line to be optimized with a target rate of the line to be optimized, and if the transmission rate is less than the target rate, updating acquired information of an optimized subcarrier on the line to be optimized, and recalculating optimized transmission power of the subcarrier to be optimized on the line to be optimized.

The present invention further provides a spectrum optimization device, including: a first calculation module configured to calculate according to acquired information of each of respective subcarriers on a DSL line to be optimized to obtain optimized transmission power of a subcarrier to be optimized on the DSL line to be optimized; a second calculation module configured to calculate according to the optimized transmission power of the subcarrier to be optimized to obtain a transmission rate of the DSL line to be optimized; and a comparison module configured to compare the transmission rate of the DSL line to be optimized with a target rate of the DSL line to be optimized, and if the transmission rate is less than the target rate, update acquired information of an optimized subcarrier on the DSL line to be optimized, and recalculating optimized transmission power of the subcarrier to be optimized in the DSL line to be optimized.

The present invention further provides a DSL system including a DSL Access Multiplexer, and further includes: a spectrum optimization device configured to calculate according to acquired information of respective subcarriers on a DSL line to be optimized to obtain optimized transmission power of a subcarrier to be optimized on the DSL line to be optimized; calculate according to the transmission power after optimization of the subcarrier to be optimized to obtain a transmission rate of the DSL line to be optimized; comparing the transmission rate of the DSL line to be optimized with a target rate of the DSL line to be optimized, and if the transmission rate is less than the target rate, update acquired information of an optimized subcarrier on the DSL line to be optimized, and recalculate optimized transmission power of the subcarrier to be optimized on the DSL line to be optimized; and the DSL Access Multiplexer is configured to set transmission power of a DSL line according to the transmission power after optimization of the subcarrier to be optimized, which is obtained by the spectrum optimization device through calculating.

As compared with the conventional art, the embodiments of the present invention have the following advantages: by adopting the above method, device and DSL system, the embodiments of the present invention overcome the problem of the conventional art that it is difficult to converge the rate weighted coefficient, and improve the rate of a given subscriber line while reduce power loss caused by the given subscriber line to other subscriber lines in the same bundle of cables.

BRIEF DESCRIPTION OF THE DRAWINGS

In order to describe the embodiments of the present invention or the technical solution of the conventional art more clearly, drawings used in the descriptions of the embodiments or the conventional art will be briefly introduced as follows. Obviously, the drawings described as follows are just some embodiments of the present invention, and a person skilled in the art can acquire other drawings based on these drawings, under the precondition that no creative effort is paid.

DETAILED DESCRIPTION OF THE EMBODIMENTS

The technical solutions of the embodiments of the present invention are further described in details through the following drawings and examples.

Figure 2:
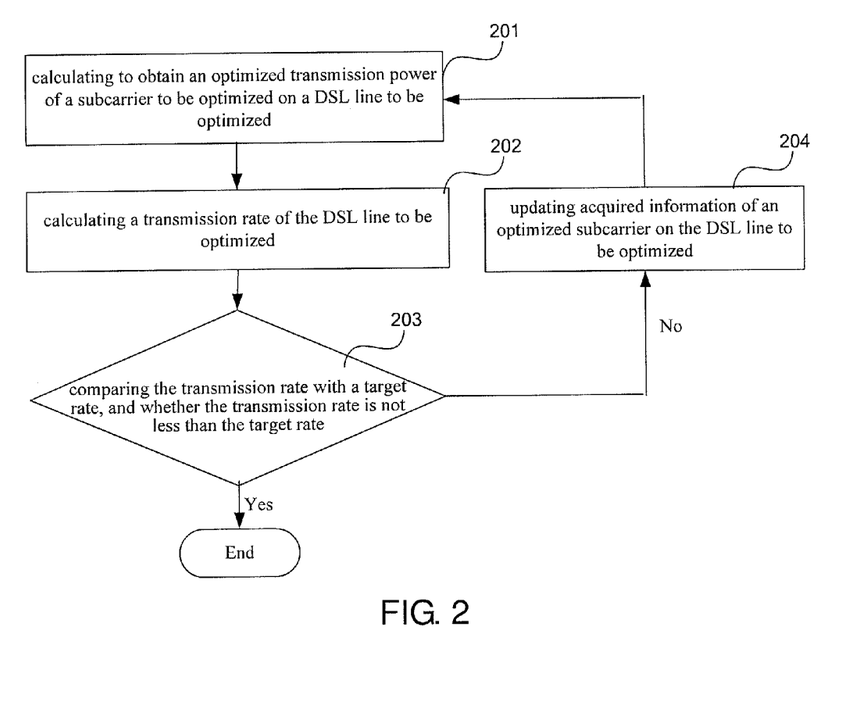
FIG. 2 is a flowchart of the embodiment of a spectrum optimization method of the present invention.

FIG. 2 is a flowchart of the embodiment of a spectrum optimization method of the present invention. As shown in FIG. 2, the spectrum optimization method includes specifically as follows.

Step 201: calculating to obtain optimized transmission power of a subcarrier to be optimized on a DSL line to be optimized; the details are as follows: a benefit-cost ratio matrix is obtained by calculating according to the acquired information of each of respective subcarriers on the DSL line to be optimized, which includes any three of minimum transmission power, maximum transmission power, step length and total amount of advisable optimized transmission power. For instance, a benefit-cost ratio matrix is obtained by calculating according to the minimum transmission power, the maximum transmission power and the step length. An optimized transmission power of the subcarrier to be optimized on the line to be optimized is obtained according to the benefit-cost ratio matrix. The step length is an interval of the advisable optimized transmission power.

The step of calculating the optimized transmission power of the subcarrier to be optimized on the line to be optimized according to the benefit-cost ratio matrix concretely includes: acquiring a maximum benefit-cost ratio and advisable optimized transmission power corresponding to the maximum benefit-cost ratio according to the benefit-cost ratio matrix; acquiring optimized transmission power of the subcarrier to be optimized on the DSL line to be optimized according to the benefit-cost ratio matrix, the maximum benefit-cost ratio and the advisable optimized transmission power corresponding to the maximum benefit-cost ratio, wherein, the subcarrier to be optimized is a subcarrier corresponding to the maximum benefit-cost ratio.

The minimum transmission power and the maximum transmission power of each of the respective subcarriers on the DSL line to be optimized can be specified by the communication standards, the minimum transmission power could be −120 dBm/HZ, and the step length can be set based on actual conditions, e.g., a step length of 20 dB can be taken for segment calculation from −120 dBm/HZ to −40 dBm/HZ.

The respective values in the benefit-cost ratio matrix are compared to obtain the maximum value as the maximum benefit-cost ratio, and the advisable optimized transmission power corresponding to the maximum benefit-cost ratio is acquired. With respect to the line to be optimized, an optimal optimized performance can be realized by optimizing the subcarrier corresponding to the maximum benefit-cost ratio with the advisable optimized transmission power corresponding to the maximum benefit-cost ratio. A column number corresponding to the maximum benefit-cost ratio is an index of the subcarrier to be optimized on the DSL line to be optimized, and the optimized transmission power of the subcarrier to be optimized is the advisable optimized transmission power corresponding to the maximum benefit-cost ratio.

In the embodiments of the present invention, the step of comparing the respective values in the benefit-cost ratio matrix may include: firstly comparing the respective column vectors in the benefit-cost ratio matrix to acquire the maximum values of the respective column vectors, and then comparing the maximum values of the respective column vectors to acquire the maximum value of the entire matrix, i.e., the maximum benefit-cost ratio. As compared with the method that directly performs a comparison to acquire the maximum benefit-cost ratio, this method reduces the arithmetic complexity.

In the benefit-cost ratio matrix, the benefit-cost ratio ($v_{k,n}(s_1 \rightarrow s_b)$) of each advisable transmission power (e.g., $s_b$) of each of the respective subcarriers to be optimized (e.g., the kth subcarrier) on the line to be optimized represents a benefit-cost ratio $v_{k,n}(s_1 \rightarrow s_b)$ when the transmission power of the subcarrier is increased from the minimum transmission power $s_1$ to the advisable transmission power $s_b$. The benefit-cost ratio $v_{k,n}(s_1 \rightarrow s_b)$ is proportional to the number of bit loading $r_{k,n}(s_1 \rightarrow s_b)$ for a gain of the subcarrier when the transmission power of the subcarrier is increased from the minimum transmission power $s_1$ to the advisable transmission power $s_b$, and the benefit-cost ratio $v_{k,n}(s_1 \rightarrow s_b)$ is inversely proportional to a cost $c_{k,n}(s_1 \rightarrow s_b)$ of a reference DSL line at the subcarrier when the transmission power of the subcarrier is increased from the minimum transmission power $s_1$ to the advisable transmission power $s_b$.

Concretely, the benefit-cost ratio matrix can be represented as follows:

$$\begin{pmatrix} v_{1,n}(s_1 \to s_B) & \cdots & v_{k,n}(s_1 \to s_B) & \cdots & v_{K,n}(s_1 \to s_B) \\ \vdots & \vdots & \vdots & \vdots & \vdots \\ v_{1,n}(s_1 \to s_b) & \cdots & v_{k,n}(s_1 \to s_b) & \cdots & v_{K,n}(s_1 \to s_b) \\ \vdots & \vdots & \vdots & \vdots & \vdots \\ v_{1,n}(s_1 \to s_1) & \cdots & v_{k,n}(s_1 \to s_1) & \cdots & v_{K,n}(s_1 \to s_1) \end{pmatrix}$$

In the expression of the benefit-cost ratio matrix, n is a serial number of the DSL line to be optimized; K is a total number of subcarriers on the DSL line to be optimized; k is a serial number or index of a subcarrier, i.e., the kth subcarrier of the DSL line; B is a total amount of the advisable optimized transmission power of the subcarrier of the DSL line to be optimized; b is a serial number or index of the advisable optimized transmission power, indicating the level of advisable optimized transmission power between the minimum transmission power and the maximum transmission power; $s_b$ is the advisable optimized transmission power of each of respective subcarriers of the DSL line and is a variable, e.g., if a step length of 20 dB is taken for segment calculation from the minimum transmission power −120 dBm/HZ to the maximum transmission power −40 dBm/HZ, $s_b$ can take a value of −120 dBm/Hz, −100 dBm/Hz, −80 dBm/Hz, −60 dBm/Hz or −40 dBm/Hz; $s_1$ is the minimum transmission power of the kth subcarrier in the nth DSL line; $s_B$ is the maximum transmission power of the kth subcarrier in the nth DSL line; $v_{k,n}(s_1 \to s_b)$ is a benefit-cost ratio when the advisable optimized transmission power at the kth subcarrier in the nth DSL line is $s_b$, and it is calculated with an equation $v_{k,n}(s_1 \to s_b) = r_{k,n}(s_1 \to s_b)/c_{k,n}(s_1 \to s_b)$, wherein $r_{k,n}(s_1 \to s_b)$ is the number of bit loading for a gain of the nth DSL line at the kth subcarrier when the transmission power of the kth subcarrier of the nth DSL line is increased from $s_1$ to $s_b$; $c_{k,n}(s_1 \to s_b)$ is a cost of the reference DSL line at the kth subcarrier when the transmission power of the kth subcarrier of the nth DSL line is increased from $s_1$ to $s_b$. The reference DSL line is preferably the longest DSL line activated at a DSL central office terminal, and may be an approximately longest one in an error allowable range. So called "activated" means that the working frequency band of the DSL line covers the kth subcarrier. If no DSL line is activated at a certain subcarrier, then the reference DSL line at the certain subcarrier will be the reference DSL line of the previous one working subcarrier.

A line of weak bearing capacity and/or a line under serious cross-talk may be a physical line in the system or a virtual line (i.e., a line assumed in the system). If the physical line in the system is to be selected, a line longer than others can be selected as the reference line according to the line length, because the longer the line is, the capacity of bearing service is weaker; and if the virtual line is to be selected, the length of the selected virtual line may be longer than any physical line in the system, and the length of the selected virtual line also may be a value between the lengths of any two physical lines in the system upon actual request. Different lines can be selected as reference service lines at different subcarriers. The aim of the embodiments of the present invention is to reduce the damage caused by each DSL line to other DSL lines at each subcarrier as much as possible while enable each DSL line to achieve its target rate under the limitation of total transmission power. In the embodiments of the present invention, a reference DSL line m(k) is the line having the weakest capacity of anti-crosstalk, thus the damage caused by each DSL line to other DSL lines at each subcarrier can be reduced by reducing the damage caused by each DSL line to the reference DSL line m(k) at each subcarrier.

The reference DSL line in the embodiments of the present invention may also be the longest DSL line at the DSL central office terminal, and such a direct arrangement can reduce the arithmetic complexity.

$c_{k,n}(s_1 \to s_b) = b_k^{m(k)}(s_k^1 \ldots s_k^{n-1}, s_b, s_k^{n+1} \ldots s_k^N) - b_k^{m(k)}(s_k^1 \ldots s_k^{n-1}, s_1, s_k^{n+1} \ldots s_k^N) + \lambda(s_b - s_1)$, wherein m(k) is the reference DSL line, $b_k^{m(k)}(s_k^1 \ldots s_k^{n-1}, s_b, s_k^{n+1} \ldots s_k^N) - b_k^{m(k)}(s_k^1 \ldots s_k^{n-1}, s_1, s_k^{n+1} \ldots s_k^N)$ is the number of bit loading lost on the reference DSL line at the kth subcarrier when the transmission power of the kth subcarrier on the nth DSL line is increased from $s_1$ to $s_b$, $\lambda(s_b - s_1)$ is an increased total transmission power controlled by the Lagrange multiplier $\lambda$, and when $P_n$ is less than $P_n^{max}$, the Lagrange multiplier $\lambda$ is 0, while when $P_n$ is equal to $P_n^{max}$, $\lambda$ is greater than 0, wherein $P_n$ is total power of the nth DSL line and $P_n^{max}$ is a total power threshold of the nth DSL line. The Lagrange multiplier $\lambda$ is used for controlling $P_n$ such that $P_n$ is not greater than $P_n^{max}$, and this can be determined through dichotomy, the details are as follows: assuming that an upper limit $\lambda^{max}$ of the Lagrange multiplier $\lambda$ is 1, a lower limit $\lambda_{min}$ thereof is 0, and assuming $\lambda = \lambda_{max}$; firstly carrying out a spectrum optimization based on this $\lambda$, and then calculating $P_n$ based on the transmission power after optimization; if $P_n > P_n^{max}$, then increasing the value of $\lambda$, assuming $\lambda_{min} = \lambda_{max}$ and $\lambda_{max} = 2\lambda_{max}$, until $\lambda$ makes $P_n \leq P_n^{max}$; through the above process, the upper limit of the Lagrange multiplier $\lambda$ can be determined; after that, if $\lambda_{max} - \lambda_{min} \geq \epsilon$, wherein $\epsilon$ is an arbitrarily small positive number, then assuming $\lambda = (\lambda_{max} + \lambda_{min})/2$, and calculating $P_n$ based on this $\lambda$; if $P_n > P_n^{max}$, then assuming $\lambda_{min} = \lambda$, and if $P_n \leq P_n^{max}$, then assuming $\lambda_{max} = \lambda$, until $\epsilon$ is an infinitely small value; at that time, the Lagrange multiplier $\lambda$ converges to a certain value.

$r_{k,n}(s_1 \to s_b) = b_k^n(s_k^1 \ldots s_k^{n-1}, s_b, s_k^{n+1} \ldots s_k^N) - b_k^n(s_k^1 \ldots s_k^{n-1}, s_1, s_k^{n+1} \ldots s_k^N)$, wherein N is a total number of the DSL lines, $b_k^n(s_k^1 \ldots s_k^N)$ is the number of bit loading for the DSL n at the kth subcarrier when the transmission powers of N DSL lines at the kth subcarrier being $s_k^1 \ldots s_k^N$ successively, $b_k^n(s_k^1 \ldots s_k^N)$ can be calculated in an equation $$b_k^n(s_k^1 \ldots s_k^N) = \log_2\left(1 + \frac{1}{\Gamma_n} \frac{|h_k^{n,n}|^2 s_k^n}{\sum_{m \neq n} |h_k^{n,m}|^2 s_k^m + \sigma_k^n}\right)$$

wherein $h_k^{n,n}$ is a channel transfer function of the nth DSL at the kth subcarrier; $h_k^{n,m}$ is the channel transfer function from the transmitter of the mth DSL line to the receiver of the nth DSL at the kth subcarrier; $\sigma_k^n$ is the background noise power of the nth DSL at the kth subcarrier; $\Gamma_n$ is signal-to-noise ratio (SNR) gap capacity; $s_k^n$ is transmission power of the kth subcarrier of the nth DSL line.

Furthermore, in the embodiments of the present invention, the transmission power after optimization of the subcarrier to be optimized can be either set as the optimized transmission power of the subcarrier to be optimized, or calculated through mathematical equation, e.g., it is set as 1.1 times of the optimized transmission power of the subcarrier to be optimized. Through the operation, the optimization of the subcarrier to be optimized is completed.

Step 202: calculating a transmission rate of the DSL line to be optimized, and the details are as follows: calculating the transmission rate of the DSL line to be optimized according to the transmission power after optimization of the subcarrier to be optimized, i.e., the optimized transmission power of the subcarrier to be optimized; wherein the transmission rate of the DSL line to be optimized can be acquired by converting the number of bit loading for the DSL line to be optimized calculated with the equation $$b_k^n(s_k^1 \ldots s_k^N) = \log_2\left(1 + \frac{1}{\Gamma_n} \frac{|h_k^{n,n}|^2 s_k^n}{\sum_{m \neq n} |h_k^{n,m}|^2 s_k^m + \sigma_k^n}\right);$$

in the above equation, $h_k^{n,n}$ is a channel transfer function of the nth DSL line at the kth subcarrier; $h_k^{n,m}$ is the channel transfer function from the transmitter of the mth DSL line to the receiver of the nth DSL at the kth subcarrier; $\sigma_k^n$ is the background noise power of the nth DSL at the kth subcarrier; $\theta_n$ is signal-to-noise ratio (SNR) gap capacity; $s_k^n$ is transmission power of the kth subcarrier of the nth DSL line.

Step 203: comparing the transmission rate of the DSL line to be optimized with a target rate of the DSL line to be optimized, and if the transmission rate is not less than the target rate, then ending the operation; and if the transmission rate is less than the target rate, then executing step 204; wherein the target rate is an object rate to be achieved by the optimization of the DSL and is a predetermined value.

Step 204: updating acquired information of optimized subcarrier on the DSL line to be optimized, and returning to step 201 to recalculate optimized transmission power of the subcarrier to be optimized on the DSL line to be optimized, such iteration is repeated until the transmission rate of the line to be optimized reaches the target rate; wherein updating the acquired information of the optimized subcarriers on the DSL line to be optimized, that is, updating the minimum transmission power in the acquired information of the optimized subcarriers as the transmission power after optimization of the subcarrier to be optimized and then recalculating an index and optimized transmission power of the subcarrier to be optimized on the DSL line to be optimized.

In the embodiments of the present invention, since only the minimum transmission power in the information of the optimized subcarrier is updated, and during each iteration, in the benefit-cost ratio matrix calculated according to the acquired minimum transmission power, maximum transmission power and step length of each subcarrier on the DSL line to be optimized, only a column value corresponding to the index of the optimized subcarrier in the benefit-cost ratio matrix is changed, thus during the recalculating process, only a column value corresponding to the index of a previously optimized one subcarrier in the benefit-cost ratio matrix shall be calculated, and hence the arithmetic complexity is reduced. During the process of calculating the column value corresponding to the index of the previously optimized one subcarrier in the benefit-cost ratio matrix, if the transmission power after optimization of the subcarrier to be optimized is greater than the optional optimized transmission power, $v_{k,n}(s_1 \rightarrow s_b)$ will be set as 0, so as to ensure that the method will not retreat, e.g., power having been added at a certain subcarrier cannot be removed. If the transmission power level is larger than the maximum transmission power, $v_{k,n}(s_1 \rightarrow s_b)$ will be set as a negative value, so as to ensure that such transmission power level will never be selected.

The subcarrier in the embodiments of the present invention may be not only a single subcarrier, but also a small set of subcarriers.

The method given in the embodiments of the present invention is a method for optimizing a single DSL line provided that the Lagrange multiplier λ is fixed. In the practice, if all the lines need to be optimized, the method shall be repeated until all the DSL lines are optimized.

During each iteration in the embodiments of the spectrum optimization method of the present invention, only the column value corresponding to the index of the optimized subcarrier in the benefit-cost ratio matrix shall be updated, thus there are KB iterations at the most, wherein B is a amount of the advisable optimized transmission power, which means that the complexity of the method is linearly related to K, the complexity for performing iterations for all the subscribers is the square of N, thus the whole complexity is O(KN$^2$). This complexity has the same power as the iterative spectrum balance algorithm, and the control is easy even with respect to hundreds of subscriber lines. In addition, viewed from an aspect of storage demand, at each subcarrier only the optimized transmission power corresponding to the maximum benefit-cost ratio shall be recorded, which means that the whole storage demand of the algorithm is very low.

Through the above method, the embodiments of the present invention may overcome the problem of the conventional art that it is difficult to converge the rate weighted coefficient, and improve the rate of a given subscriber line while reduce power loss caused by the given subscriber line to other subscriber lines in the same bundle of cables.

Embodiment of a Spectrum Optimization Device

Figure 3:
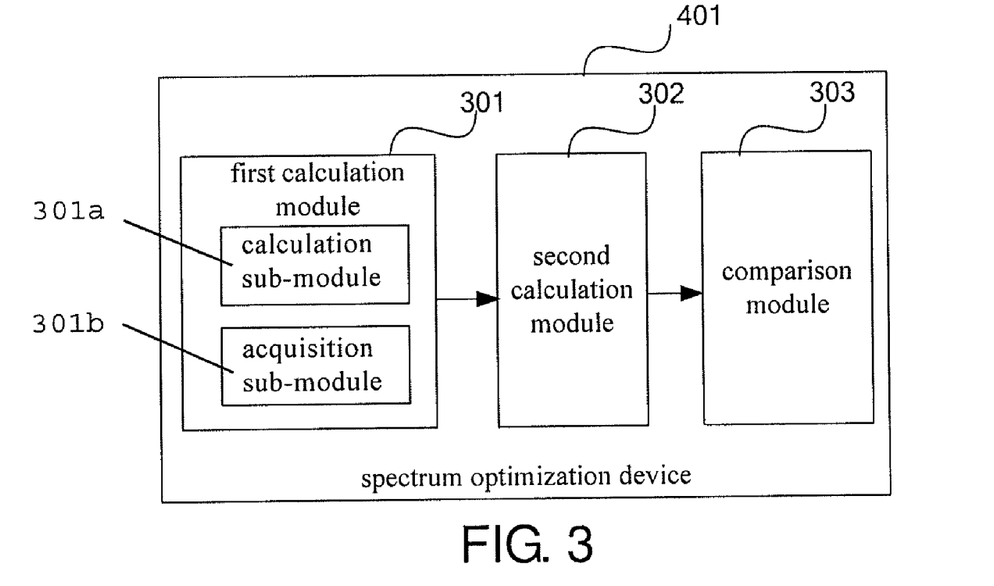
FIG. 3 is a structural diagram of the embodiment of a spectrum optimization device of the present invention.

FIG. 3 is the embodiment of a spectrum optimization device 401 according to the present invention, as shown in FIG. 3, the spectrum optimization device 401 includes a first calculation module 301, a second calculation module 302 and a comparison module 303.

The first calculation module 301 is configured to calculate according to acquired information of each of respective subcarriers on a DSL line to be optimized to obtain an optimized transmission power of a subcarrier to be optimized on the DSL line to be optimized; wherein the acquired information of each of the respective subcarriers on the DSL line to be optimized includes any three of minimum transmission power, maximum transmission power, step length and total amount of advisable optimized transmission power of each of the respective subcarrier on the line to be optimized. The first calculation module 301 is configured to calculate to obtain a benefit-cost ratio matrix according to the acquired information of each of the respective subcarriers on the DSL line to be optimized, such as the minimum transmission power, the maximum transmission power and the step length, and acquires a maximum benefit-cost ratio and advisable optimized transmission power corresponding to the maximum benefit-cost ratio according to the benefit-cost ratio matrix, then acquire the optimized transmission power of the subcarrier to be optimized on the line to be optimized according to the benefit-cost ratio matrix, the maximum benefit-cost ratio and the advisable optimized transmission power corresponding to the maximum benefit-cost ratio. A column number corresponding to the maximum benefit-cost ratio is an index of the subcarrier to be optimized on the DSL line to be optimized, and the optimized transmission power of the subcarrier to be optimized is the advisable optimized transmission power corresponding to the maximum benefit-cost ratio. The detailed processing performed by the first calculation module 301 refers to the description of the above method, and herein unnecessary descriptions will not be given.

The second calculation module 302 is configured to calculate a transmission rate of the DSL line to be optimized according to the transmission power after optimization of the subcarrier to be optimized; and the comparison module 303 is configured to compare the data rate of the DSL line to be optimized with a target rate of the DSL line to be optimized, and if the transmission rate is less than the target rate, then update acquired information of optimized subcarrier on the DSL line to be optimized, and recalculate optimized transmission power of the subcarrier to be optimized on the DSL line to be optimized; and if the transmission rate is not less than the target rate, then end the operation.

The way to update the acquired information of the optimized subcarrier on the DSL line to be optimized concretely include the following steps: updating the minimum transmission power in the acquired information of the optimized subcarrier on the DSL line to be optimized as the transmission power after optimization of the subcarrier to be optimized.

In the embodiments of the present invention, the first calculation module 301 may include a calculation sub-module 301a and an acquisition sub-module 301b. The calculation sub-module 301a is configured to calculate a benefit-cost ratio matrix according to acquired information of each of respective subcarrier on the DSL line to be optimized, such as any three of the minimum transmission power, the maximum transmission power, the step length and the total amount of advisable optimized transmission power, and acquire the maximum benefit-cost ratio and the advisable optimized transmission power corresponding to the maximum benefit-cost ratio according to the benefit-cost ratio matrix. The acquisition sub-module 301b is configured to acquire optimized transmission power of the subcarrier to be optimized on the line to be optimized according to the benefit-cost ratio matrix, the maximum benefit-cost ratio and the advisable optimized transmission power corresponding to the maximum benefit-cost ratio.

The way to calculate to obtain the benefit-cost ratio matrix according to acquired information of each of the respective subcarriers on the DSL line to be optimized, such as any three of the minimum transmission power, the maximum transmission power, the step length and the total amount of advisable optimized transmission power, and acquire the maximum benefit-cost ratio and the advisable optimized transmission power corresponding to the maximum benefit-cost ratio according to the benefit-cost ratio matrix concretely includes the following steps: calculating the benefit-cost ratio matrix according to any three of the minimum transmission power, the maximum transmission power, the step length and the total amount of advisable optimized transmission power of each of the respective subcarrier on the DSL line to be optimized with an equation $v_{k,n}(s_1 \rightarrow s_b) = r_{k,n}(s_1 \rightarrow s_b)/c_{k,n}(s_1 \rightarrow s_b)$, comparing respective values in the benefit-cost ratio matrix to obtain the maximum value as the maximum benefit-cost ratio, and acquiring the advisable optimized transmission power corresponding to the maximum benefit-cost ratio; $r_{k,n}(s_1 \rightarrow s_b)$ represents the number of bit loading for a gain of the nth DSL line at the kth subcarrier when the transmission power of the kth subcarrier on the nth DSL line is increased from $s_1$ to $s_b$, and $c_{k,n}(s_1 \rightarrow s_b)$ represents a cost of a reference DSL line at the kth subcarrier when the transmission power of the kth subcarrier of the nth DSL line is increased from $s_1$ to $s_b$; the reference DSL line is preferably the longest DSL line in a DSL system or the longest DSL line activated in the DSL system.

Through the above device, the embodiments of the present invention may overcome the problem of the conventional art that it is difficult to converge the rate weighted coefficient, and improve the rate of a given subscriber line while reduce power loss caused by the given subscriber line to other subscriber lines in the same bundle of cables.

Embodiment of a Spectrum Optimization System

Figure 4:
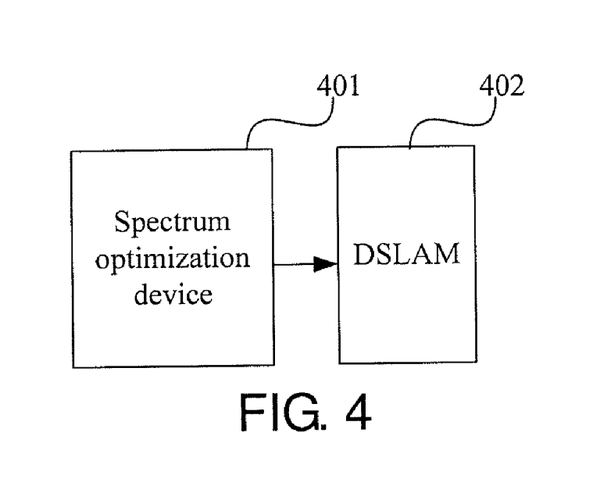
FIG. 4 is a structural diagram of the embodiment of a DSL system of the present invention.

FIG. 4 is the embodiment of a DSL system according to the present invention; as shown in FIG. 4, the DSL system includes a spectrum optimization device 401 and a DSL Access Multiplexer (DSLAM) 402; the spectrum optimization device 401 is configured to calculate to obtain optimized transmission power of a subcarrier to be optimized on a DSL line to be optimized according to acquired information of each of the respective subcarriers on the DSL line to be optimized; calculate a transmission rate of the DSL line to be optimized according to the transmission power after optimization of the subcarrier to be optimized; compare the transmission rate of the DSL line to be optimized with a target rate of the DSL line to be optimized, and if the transmission rate is less than the target rate, then to update acquired information of optimized subcarrier on the DSL the line to be optimized, and recalculate optimized transmission power of the subcarrier to be optimized on the DSL line to be optimized; and if the transmission rate is not less than the target rate, then end the operation. The DSLAM 402 sets transmission power of the DSL line according to the optimized transmission power of the subcarrier to be optimized, which is set by the spectrum optimization device 401.

Through the above system, the embodiments of the present invention may overcome the problem in the conventional art that it is difficult to converge the rate weighted coefficient, and improve the rate of a given subscriber line while reduce power loss caused by the given subscriber line to other subscriber lines in the same bundle of cables.

Through the descriptions of the above embodiments, a person skilled in the art can clearly understand that the present invention can be implemented by hardware, or by software and necessary hardware platform. On the basis of such understanding, the technical solution of the present invention can be reflected in a form of software product, and the software product can be stored in any nonvolatile storage media (e.g., CD-ROM, U-disk, mobile hard disk, etc.), including several instructions for enabling a computer device (e.g., PC, server, network device, etc.) to execute the methods according to the embodiments of the present invention.

Finally, it shall be pointed out that the above embodiments are just used for describing the technical solution of the present invention, instead of limiting it. Although the present invention is described in details in reference to the preferred embodiments, persons skilled in the art shall understand that changes or equivalent substitutions still can be carried out to the technical solution of the present invention, without deviating from the spirit and scope of the technical solution of the present invention.

The invention claimed is:

1. A spectrum optimization method for a Digital Subscriber Line (DSL) system, comprising:

calculating a benefit-cost ratio matrix including a plurality of benefit-cost ratios according to acquired information of respective subcarriers on a line to be optimized, wherein each of the plurality of benefit-cost ratios corresponds to a combination of a certain advisable transmission power $s_b$ and a certain subcarrier, and represents a benefit-cost ratio when the certain advisable power $s_b$ is adopted at the certain subcarrier;

obtaining optimized transmission power of a subcarrier to be optimized according to the benefit-cost ratio matrix;

calculating, according to the optimized transmission power of the subcarrier to be optimized, a transmission rate of the line to be optimized; and comparing the transmission rate of the line to be optimized with a target rate of the line to be optimized, and if the transmission rate is less than the target rate, updating acquired information of an optimized subcarrier on the line to be optimized, and recalculating optimized transmission power of the subcarrier to be optimized on the line to be optimized.

2. The spectrum optimization method for the DSL system according to claim 1, wherein, the acquired information of each of the respective subcarriers on the line to be optimized comprises any three of minimum transmission power, maximum transmission power, step length and total amount of advisable optimized transmission power of each subcarrier on the line to be optimized.

3. The spectrum optimization method for the DSL system according to claim 1, wherein the benefit-cost ratio corresponding to the combination of the certain advisable transmission power and the certain subcarrier is proportional to the number of bit loading for a gain at the certain subcarrier when the transmission power of the certain subcarrier is increased from the minimum transmission power to the certain advisable transmission power, and is inversely proportional to a cost of a reference DSL line at the certain subcarrier when the transmission power of the certain subcarrier is increased from the minimum transmission power to the certain advisable transmission power.

4. The spectrum optimization method for the DSL system according to claim 3, wherein, the reference DSL line is the longest DSL line within DSL lines with working frequency bands covering the subcarrier to be optimized.

5. The spectrum optimization method for the DSL system according to claim 3, wherein, the method further comprises: calculating a cost $c_{k,n}(s_1 \rightarrow s_b)$ of the reference DSL line at the subcarrier when the transmission power of the subcarrier is increased from the minimum transmission power $s_1$ to the certain advisable transmission power $s_b$, wherein n is a serial number of the line to be optimized, and k is a serial number of the subcarrier to be optimized;

the cost $c_{k,n}(s_1 \rightarrow s_b)$ is calculated with an equation:

$$c_{k,n}(s_1 \rightarrow s_b) = b_k^{m(k)}(s_k^1 \ldots s_k^{n-1}, s_b, s_k^{n+1} \ldots s_k^N) - b_k^{m(k)}(s_k^1 \ldots s_k^{n-1}, s_1, s_k^{n+1} \ldots s_k^N) + \lambda(s_b - s_1)$$

wherein N is a total number of the DSL lines; $b_k^{m(k)}(s_k^1 \ldots s_k^{n-1}, s_b, s_k^{n+1} \ldots s_k^N) - b_k^{m(k)}(s_k^1 \ldots s_k^{n-1}, s_1, s_k^{n+1} \ldots s_k^N)$ is the number of bit loading lost by the reference DSL line at the $k^{th}$ subcarrier when the transmission power of the $k^{th}$ subcarrier of the $n^{th}$ DSL line is increased from $s_1$ to $s_b$; $\lambda(s_b - s_1)$ is totally increased transmission power; m(k) is a reference DSL corresponding to the $k^{th}$ subcarrier; and $\lambda$ is a Lagrange multiplier.

6. The spectrum optimization method for the DSL system according to claim 5, wherein, the Lagrange multiplier $\lambda$ is used for controlling $P_n$ such that $P_n$ is not greater than $P_n^{max}$, wherein $P_n$ is total power of the $n^{th}$ DSL line, and $P_n^{max}$ is a total power threshold of the $n^{th}$ DSL line.

7. The spectrum optimization method for the DSL system according to claim 5, wherein, the number of bit loading $r_{k,n}(s_1 \rightarrow s_b)$ of the gain of the $n^{th}$ DSL line at the $k^{th}$ subcarrier is calculated according to an equation $$r_{k,n}(s_1 \rightarrow s_b) = b_k^n(s_k^1 \ldots s_k^{n-1}, s_b, s_k^{n+1} \ldots s_k^N) - b_k^n(s_k^1 \ldots s_k^{n-1}, s_1, s_k^{n+1} \ldots s_k^N),$$

wherein N is a total number of the DSL lines; $b_k^n(s_k^1 \ldots s_k^N)$ is the number of bit loading for the $n^{th}$ DSL line at the $k^{th}$ subcarrier, when transmission power of N DSL lines at the $k^{th}$ subcarrier being $s_k^1 \ldots s_k^N$ successively.

8. The spectrum optimization method for the DSL system according to claim 1, wherein, updating the acquired information of the optimized subcarrier on the line to be optimized concretely comprises:

updating the minimum transmission power in the acquired information of the optimized subcarrier on the line to the optimized as the transmission power after optimization of the subcarrier to be optimized.

9. An apparatus comprising a spectrum optimization device which comprises:

a first calculation module configured to calculate according to acquired information of respective subcarriers on a digital subscriber line (DSL) line to be optimized to obtain an optimized transmission power of a subcarrier to be optimized on the DSL line to be optimized;

a second calculation module configured to calculate according to the optimized transmission power of the subcarrier to be optimized to obtain a transmission rate of the DSL line to be optimized according to the optimized transmission power of the subcarrier to be optimized; and a comparison module configured to compare the transmission rate of the DSL line to be optimized with a target rate of the DSL line to be optimized, and if the transmission rate is less than the target rate, update acquired information of an optimized subcarrier on the DSL line to be optimized, and recalculate optimized transmission power of the subcarrier to be optimized on the DSL line to be optimized;

wherein the first calculation module comprises:

a calculation sub-module, configured to calculate to obtain a benefit-cost ratio matrix according to any three of acquired minimum transmission power, maximum transmission power, step length and total amount of advisable optimized transmission power of each subcarrier on the DSL line to be optimized, and acquire a maximum benefit-cost ratio and advisable optimized transmission power corresponding to the maximum benefit-cost ratio according to the benefit-cost ratio matrix; and an acquisition sub-module, configured to acquire optimized transmission power of the subcarrier to be optimized on the line to be optimized according to the benefit-cost ratio matrix, the maximum benefit-cost ratio and the advisable optimized transmission power corresponding to the maximum benefit-cost ratio.

10. The apparatus according to claim 9, wherein, the calculation sub-module is configured to calculate the benefit-cost ratio matrix according to any three of the acquired minimum transmission power, maximum transmission power, step length and total amount of advisable optimized transmission power of each subcarrier on the DSL line to be optimized, and acquire the maximum benefit-cost ratio and the advisable optimized transmission power corresponding to the maximum benefit-cost ratio according to the benefit-cost ratio matrix concretely comprises: the calculation sub-module is configured to calculate to obtain the benefit-cost ratio matrix with an equation $v_{k,n}(s_1 \rightarrow s_b) = r_{k,n}(s_1 \rightarrow s_b)/c_{k,n}(s_1 \rightarrow s_b)$ according to any three of the acquired minimum transmission power, maximum transmission power, step length and total amount of advisable optimized transmission power of each of respective subcarrier on the DSL line to be optimized, then comparing respective values in the benefit-cost ratio matrix to acquire the maximum value as the maximum benefit-cost ratio, and acquire the advisable optimized transmission power corresponding to the maximum benefit-cost ratio;

wherein $r_{k,n}(s_1 \to s_b)$ represents the number of bit loading for a gain of the $n^{th}$ DSL line at the $k^{th}$ subcarrier when the transmission power of the $k^{th}$ subcarrier of the $n^{th}$ DSL line is increased from $s_1$ to $s_b$, and $c_{k,n}(s_1 \to s_b)$ represents a cost of a reference DSL line at the $k^{th}$ subcarrier when the transmission power of the $k^{th}$ subcarrier of the $n^{th}$ DSL line is increased from $s_1$ to $s_b$.

11. The apparatus according to claim 10, wherein, the reference DSL line is the longest DSL line within DSL lines with working frequency bands covering the subcarrier to be optimized.

12. The apparatus according to claim 10, further comprising a DSL Access Multiplexer coupled to the spectrum optimization device, and configured to set transmission power of the DSL line according to the transmission power after optimization of the subcarrier to be optimized, wherein the transmission power is obtained by the spectrum optimization device through calculating.

13. An apparatus comprising a processor configured to implement a method comprising:
   calculating according to a acquired information of a plurality of subcarriers on a digital subscriber line (DSL) line to be optimized to obtain a plurality of groups of benefit-cost ratios about the number of bit loading, each group of which corresponds to one of the plurality of subcarriers and comprises a plurality of benefit-cost ratios corresponding to a plurality of transmission powers;
   determining a transmission power after optimization according to the plurality of groups of benefit-cost ratios, wherein the transmission power after optimization is based on a transmission power corresponding to a certain benefit-cost ratio;
   calculating according to the transmission power after optimization to obtain a transmission rate of the DSL line to be optimized; and
   comparing the transmission rate of the DSL line to be optimized with a target rate of the DSL line to be optimized, and if the transmission rate is less than the target rate, updating information of an optimized subcarrier on the DSL line to be optimized, and recalculating transmission power after optimization of a certain group of benefit-cost ratios corresponding to the optimized subcarrier;
   selecting a reference digital subscriber line (DSL) line according to a parameter of a bundle of DSL lines in which the DSL line to be optimized is arranged; and
   wherein the step of calculating to obtain the plurality of groups of benefit-cost ratios comprises: calculating to obtain the plurality of groups of benefit-cost ratios such that each benefit-cost ratio corresponding to a corresponding transmission power and a corresponding subcarrier represents a ratio of the number of bit loading of the DSL line to be optimized for a gain at the corresponding subcarrier to a bit loading lost on the reference DSL line at the corresponding subcarrier when a transmission power of the corresponding subcarrier is increased from the minimum of the plurality of transmission powers to the corresponding transmission power.

14. An apparatus according to claim 13, wherein the certain benefit-cost ratio is the maximum benefit-ratio of the plurality groups of benefit-ratios.

15. An apparatus according to claim 14, wherein the step of updating the information of the optimized subcarrier on the DSL line to be optimized comprises: updating a minimum transmission power of the optimized subcarrier as the transmission power after optimization.

16. An apparatus comprising a processor configured to:
   calculate a benefit-cost ratio matrix including a plurality of benefit-cost ratios according to acquired information of respective subcarriers on a line to be optimized, wherein each of the plurality of benefit-cost ratios corresponds to a combination of a certain advisable transmission power $s_b$ and a certain subcarrier, and represents a benefit-cost ratio when the certain advisable power $s_b$ is adopted at the certain subcarrier;
   obtain an optimized transmission power of a subcarrier to be optimized according to the benefit-cost ratio matrix;
   calculate according to the optimized transmission power of the subcarrier to be optimized to obtain a transmission rate of the line to be optimized; and
   compare the transmission rate of the line to be optimized with a target rate of the line to be optimized, and if the transmission rate is less than the target rate, updating acquired information of an optimized subcarrier on the line to be optimized, and recalculating optimized transmission power of the subcarrier to be optimized on the line to be optimized.

17. The apparatus according to claim 16, wherein the acquired information of each of the respective subcarriers on the line to be optimized comprises any three of minimum transmission power, maximum transmission power, step length and total amount of advisable optimized transmission power of each subcarrier on the line to be optimized.

18. The apparatus according to claim 16, wherein the benefit-cost ratio corresponding to the combination of the certain advisable transmission power and the certain subcarrier is proportional to the number of bit loading for a gain at the certain subcarrier when the transmission power of the certain subcarrier is increased from the minimum transmission power to the certain advisable transmission power, and is inversely proportional to a cost of a reference digital subscriber line (DSL) line at the certain subcarrier when the transmission power of the certain subcarrier is increased from the minimum transmission power to the certain advisable transmission power.

* * * * *